(12) United States Patent
Wu

(10) Patent No.: US 12,501,295 B2
(45) Date of Patent: Dec. 16, 2025

(54) RADIO LINK MONITORING METHOD, TERMINAL, AND NETWORK SIDE DEVICE

(71) Applicant: VIVO MOBILE COMMUNICATION CO., LTD., Dongguan (CN)

(72) Inventor: Yumin Wu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 553 days.

(21) Appl. No.: 17/948,200

(22) Filed: Sep. 19, 2022

(65) Prior Publication Data

US 2023/0012892 A1 Jan. 19, 2023

Related U.S. Application Data

(63) Continuation of application No. PCT/CN2021/082289, filed on Mar. 23, 2021.

(30) Foreign Application Priority Data

Mar. 24, 2020 (CN) .......................... 202010215187.2

(51) Int. Cl.
*H04W 24/08* (2009.01)
*H04W 24/04* (2009.01)
*H04W 24/10* (2009.01)

(52) U.S. Cl.
CPC .......... *H04W 24/08* (2013.01); *H04W 24/04* (2013.01); *H04W 24/10* (2013.01)

(58) Field of Classification Search
CPC ..... H04W 24/08; H04W 24/04; H04W 24/10; H04W 76/15; H04W 76/27; H04W 76/19; H04L 5/005; H04L 5/0053; H04L 5/001; H04L 5/0037; H04L 5/0091; Y02D 30/70
See application file for complete search history.

(56) References Cited

U.S. PATENT DOCUMENTS

| 2020/0092018 | A1 | 3/2020 | Hwang et al. | |
| 2020/0350972 | A1* | 11/2020 | Yi | H04L 5/0051 |
| 2021/0050968 | A1* | 2/2021 | Yi | H04L 5/001 |
| 2021/0058997 | A1* | 2/2021 | Zhang | H04W 24/08 |
| 2022/0255689 | A1* | 8/2022 | Wen | H04W 24/10 |

(Continued)

FOREIGN PATENT DOCUMENTS

| CN | 103858465 A | 6/2014 |
| WO | 2014068535 A2 | 5/2014 |
| WO | 2016168985 A1 | 10/2016 |

(Continued)

OTHER PUBLICATIONS

International Search Report issued in corresponding International Application No. PCT/CN2021/082289, mailed Jun. 15, 2021, 4 pages.

(Continued)

*Primary Examiner* — Tejis Daya
(74) *Attorney, Agent, or Firm* — IPX PLLC

(57) ABSTRACT

A method for radio link monitoring, a terminal, and a network side device are provided. The radio link monitoring method is performed by a terminal, includes: performing, in a case that a first cell or a first BWP corresponds to a plurality of transmission nodes, radio link monitoring on at least one first transmission node in the plurality of transmission nodes.

20 Claims, 8 Drawing Sheets

(56) References Cited

U.S. PATENT DOCUMENTS

2023/0156505 A1* 5/2023 Wu ...................... H04W 24/10
 370/242

FOREIGN PATENT DOCUMENTS

WO  2019029364 A1  2/2019
WO  2019036120 A1  2/2019

OTHER PUBLICATIONS

Intel Corporation, "Radio Link Monitoring for NR", 3GPP TSG RAN WG1 Meeting NR Ad-hoc #3 R1-1716283 Nagoya, Japan, Sep. 18-21, 2017.
Partial supplementary European Search Report issued in related European Application No. 21774971.2, mailed Aug. 21, 2023, 13 pages.
Extended European Search Report issued in related European Application No. 21774971.2, mailed Nov. 21, 2023, 12 pages.

* cited by examiner

Perform, in a case that a first cell or a first BWP corresponds to a plurality of transmission nodes, radio link monitoring on at least one first transmission node in the plurality of transmission nodes — 21

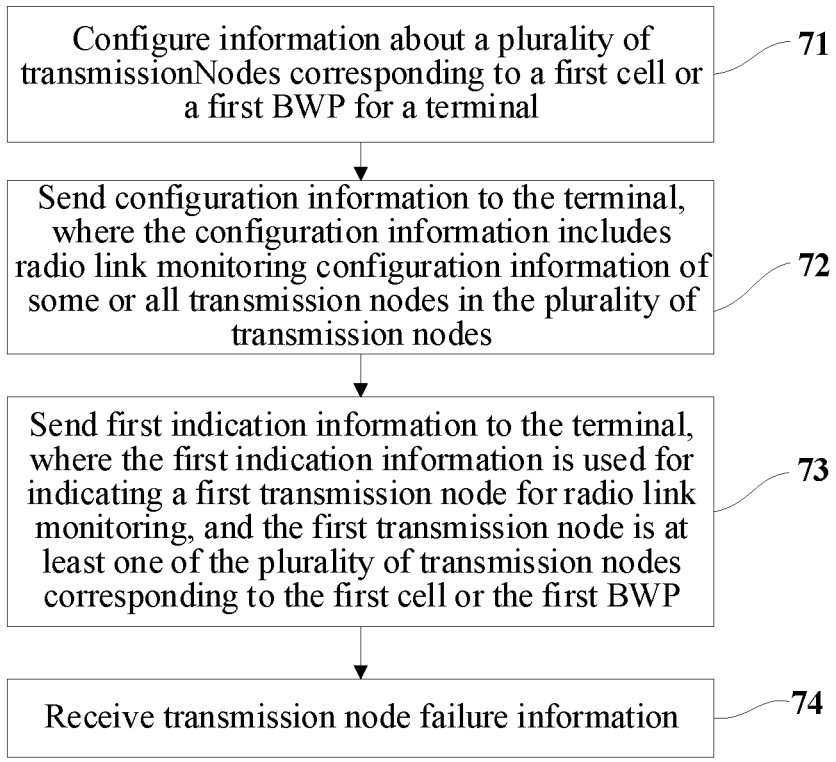

RADIO LINK MONITORING METHOD, TERMINAL, AND NETWORK SIDE DEVICE

CROSS-REFERENCE TO RELATED APPLICATIONS

This application is a continuation of International Application No. PCT/CN2021/082289, filed Mar. 23, 2021, which claims priority to Chinese Patent Application No. 202010215187.2, filed Mar. 24, 2020. The entire contents of each of the above-referenced applications are expressly incorporated herein by reference.

TECHNICAL FIELD

Embodiments of the present disclosure relate to a field of wireless communication technologies, and in particular, to a radio link monitoring method, a terminal, and a network side device.

BACKGROUND

User Equipment (UE, also referred to as a terminal) may have the following types of connection failures:

1) Handover failure (for example, the handover is not completed within a specified time (for example, timer t304 expiry)).

2) Secondary Cell Group (SCG) change failure (for example, access to a new SCG is not completed within a specified time (for example, timer t307 expiry)).

3) Radio Link Failure (RLF).

The "radio link failure" includes the following:

1) Physical layer out-of-sync (for example, timer t310 expiry).

2) Random access failure at the Medium Access Control (MAC) layer (for example, reaching the maximum number of random access attempts).

3) Indication indicating that the Radio Link Control (RLC) layer reaches the maximum number of retransmissions (for example, reaching the maximum number of retransmissions of the RLC layer).

4) Beam failure (for example, a beam recovery process failure).

The detection of physical layer out-of-sync, also referred to as Radio Link Monitoring (RLM), is performed in a primary cell (PCell) and a primary secondary cell (PSCell) respectively.

The physical layer of the UE may provide indication information indicating the physical layer link state (such as the PCell or the PSCell) to the Radio Resource Control (RRC) layer:

1) Indicating "in-sync" when the channel quality is good.

2) Indicating "out-of-sync" when the channel quality is poor.

When the UE receives N310 consecutive "out-of-sync" indications, the UE starts the T310 timer.

When the UE receives N311 consecutive "in-sync" indications, if the T310 timer is running, the UE stops the T310 timer.

If the T310 timer expires, the UE considers that the monitored radio link has a problem.

In the prior art, because the quality of transmission signals of one serving cell (or one Bandwidth Part (BWP)) only comes from one Transmission node (TRP), the RLM needs to be performed on only the serving cell (or the BWP). However, when the quality of transmission signals of one serving cell (or one BWP) comes from a plurality of transmission nodes, how to perform signal quality detection on the plurality of transmission nodes of the serving cell (or the BWP) is a problem that needs to be resolved.

SUMMARY

Embodiments of the present disclosure provide a radio link monitoring method, a terminal, and a network side device.

According to a first aspect, an embodiment of the present disclosure provides a radio link monitoring method, performed by a terminal, including:

performing, in a case that a first cell or a first BWP corresponds to a plurality of transmission nodes, radio link monitoring on at least one first transmission node in the plurality of transmission nodes.

According to a second aspect, an embodiment of the present disclosure provides a radio link monitoring method, performed by a network side device, including:

sending first indication information to a terminal, where the first indication information is used for indicating a first transmission node for radio link monitoring, and the first transmission node is at least one of a plurality of transmission nodes corresponding to a first cell or a first BWP.

According to a third aspect, an embodiment of the present disclosure provides a terminal, including:

a radio link monitoring module, configured to perform, in a case that a first cell or a first BWP corresponds to a plurality of transmission nodes, radio link monitoring on at least one first transmission node in the plurality of transmission nodes.

According to a fourth aspect, an embodiment of the present disclosure provides a network side device, including:

a first sending module, configured to send first indication information to a terminal, where the first indication information is used for indicating a first transmission node for radio link monitoring, and the first transmission node is at least one of a plurality of transmission nodes corresponding to a first cell or a first BWP.

According to a fifth aspect, an embodiment of the present disclosure provides a terminal, including a processor, a memory, and a computer program stored in the memory and executable by the processor, where when executed by the processor, the computer program implements the steps of the radio link monitoring method according to the first aspect.

According to a sixth aspect, an embodiment of the present disclosure provides a network side device, including a processor, a memory, and a computer program stored in the memory and executable by the processor, where when executed by the processor, the computer program implements the steps of the radio link monitoring method according to the second aspect.

According to a seventh aspect, an embodiment of the present disclosure provides a computer-readable storage medium, storing a computer program, where when executed by the processor, the computer program implements the steps of the radio link monitoring method according to the first aspect, or where when executed by the processor, the computer program implements the steps of the radio link monitoring method according to the second aspect.

In the embodiments of the present disclosure, in a case that the serving cell or BWP corresponds to a plurality of transmission nodes, radio link monitoring is performed on at least one first transmission node in the plurality of transmission nodes, which clarifies a radio link monitoring manner when one serving cell or BWP corresponds to a plurality of transmission nodes, so that the terminal side and the network side have the same understanding, thereby ensuring the normal execution of the subsequent communication procedure.

BRIEF DESCRIPTION OF THE DRAWINGS

Various other advantages and benefits become clear to a person of ordinary skill in the art by reading the following detailed description of exemplary implementations. The accompanying drawings are merely used for illustrating preferred implementations and are not intended to constitute a limitation on the present disclosure. Throughout the accompanying drawings, the same reference numerals are used to represent the same components. In the accompanying drawings:

FIG. 6 is a schematic flowchart of a radio link monitoring method according to Embodiment 5 of the present disclosure;

FIG. 7 is a schematic flowchart of a radio link monitoring method according to Embodiment 6 of the present disclosure;

DETAILED DESCRIPTION

In addition, the terms "include" and any variant thereof in the description and claims of the present application are intended to cover the non-exclusive inclusion. For example, a process, method, system, product, or device that includes a series of steps or units is not necessarily limited to those expressly listed steps or units, but may include other steps or units not expressly listed or inherent to such a process, method, product, or device. In addition, "and/or" used in the description and claims represents at least one of connected objects. For example, A and/or B represents the following three cases: Only A exists, only B exists, and both A and B exist.

In addition, in the embodiments of the present disclosure, the term "exemplary" or "for example" is used to represent giving an example, an illustration, or a description. Any embodiment or design scheme described as "exemplary" or "for example" in the embodiments of the present disclosure should not be construed as being preferred or superior to other embodiments or design schemes. Exactly, use of the term, such as "exemplarily" or "for example", is intended to present a related concept in a specific manner.

The following describes the embodiments of the present disclosure with reference to the accompanying drawings. A radio link monitoring method, a terminal, and a network side device provided in the embodiments of the present disclosure can be applied to a wireless communication system. The wireless communication system may be a 5G system, an Evolved Long Term Evolution (eLTE) system, or a subsequent evolved communication system.

Figures 1, 2:
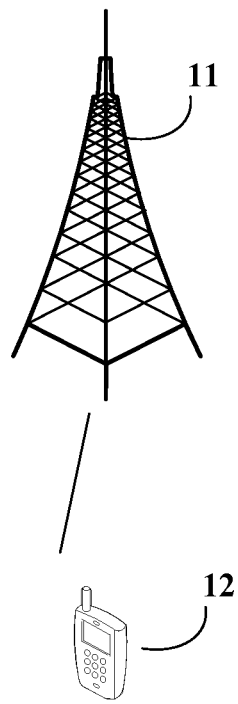
FIG. 1 is a schematic architectural diagram of a wireless communication system according to an embodiment of the present disclosure.
FIG. 2 is a schematic flowchart of a radio link monitoring method according to Embodiment 1 of the present disclosure.

FIG. 1 is a schematic architectural diagram of a wireless communication system according to an embodiment of the present disclosure. As shown in FIG. 1, the wireless communication system may include a network side device 11 and terminal 12. The terminal 12 may be connected to the network side device 11. In actual application, connections between the foregoing devices may be wireless connections. For convenience of visually showing a connection relationship between the devices, solid lines are used for illustration in FIG. 1.

It should be noted that the communication system may include a plurality of terminals 12. The network side device 11 may communicate with (transmit signaling or transmit data) the plurality of terminals 12.

The network side device 11 provided in the embodiments of the present disclosure may be a base station. The base station may be a device, such as a generally used base station, an evolved NodeB (eNB), or a network side device (for example, a next-generation NodeB (gNB), a transmission and reception point TRP)), or a cell in the 5G system, or a network side device in a subsequent evolved communication system.

The terminal 12 provided in the embodiments of the present disclosure may be a mobile phone, a tablet computer, a laptop computer, an Ultra-Mobile Personal Computer (UMPC), a netbook, a Personal Digital Assistant (PDA), or the like.

Firstly, some communication terms involved in the embodiments of the present disclosure are briefly described below:

1. Brief Description of Carrier Aggregation (CA)

The UE can be configured to work under carriers (Component Carrier, CC) of different frequencies (that is, different Absolute Radio Frequency Channel Number (ARFCN)) at the same time, where CA includes one Primary Cell (PCell) and one or more Secondary Cell (SCell). Each carrier is a specific serving cell, is configured with a corresponding serving cell identifier (for example, Serving Cell Id), and corresponds to one Hybrid Automatic Repeat Request (HARQ) entity. The HARQ entity includes a plurality of HARQ processes. The configuration of one serving cell includes common cell configuration that is applicable to all UEs in that cell and dedicated cell configuration that is applicable to specific UE.

2. Brief Description of Bandwidth Part (BWP)

For a specific cell, up to four BWPs can be configured on the network side, corresponding to different working frequency ranges. The network side may indicate an active BWP through Downlink Control Information (DCI) signaling. For a specific cell, the UE can only have one active BWP at a time.

3. Brief Description of Dual Connectivity (DC)

The UE may establish connections in two groups (that is, a Master Cell Group (MCG) and a Secondary Cell Group (SCG)) at the same time. The MCG includes a Primary Cell (PCell) and a Secondary Cell (SCell). The SCG includes a Primary Secondary Cell (PSCell) and a SCell. The PCell and the PSCell may be also referred to as Special Cell (SpCell).

To resolve the problem of how to perform, when the quality of transmission signals of one serving cell (or one BWP) comes from a plurality of transmission nodes, signal quality detection on the plurality of transmission nodes of the serving cell (or the BWP), refer to FIG. 2, which is a schematic flowchart of a radio link monitoring method according to an embodiment of the present disclosure. The method is performed by a terminal, and includes the following steps:

Step 21: Perform, in a case that a first cell or a first BWP corresponds to a plurality of transmission nodes, radio link monitoring on at least one first transmission node in the plurality of transmission nodes.

In the embodiments of the present disclosure, in a case that the serving cell or BWP corresponds to a plurality of transmission nodes, radio link monitoring is performed on at least one first transmission node in the plurality of transmission nodes, which clarifies a radio link monitoring manner when one serving cell or BWP corresponds to a plurality of transmission nodes, so that the terminal side and the network side have the same understanding, thereby ensuring the normal execution of the subsequent communication procedure.

Figure 3:
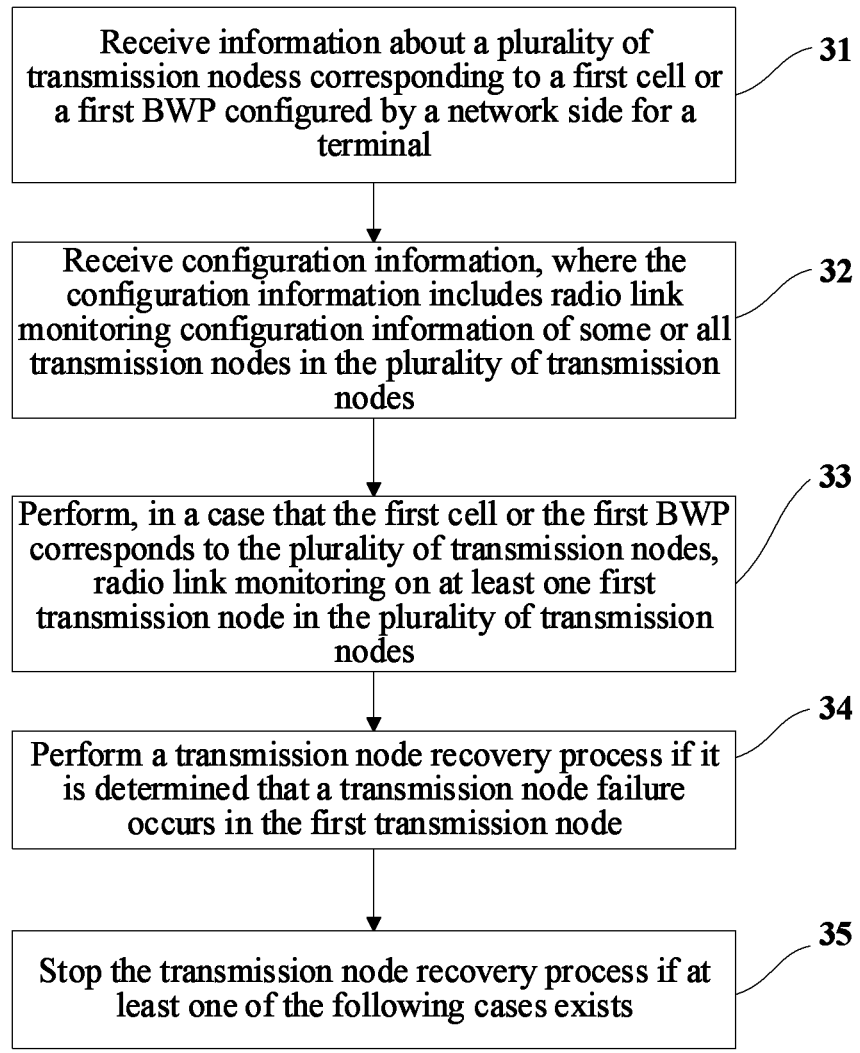
FIG. 3 is a schematic flowchart of a radio link monitoring method according to Embodiment 2 of the present disclosure.

In some embodiments of the present disclosure, referring to FIG. 3, before the performing radio link monitoring on at least one first transmission node in the plurality of transmission nodes (that is, step 33 in FIG. 3), the method further includes the following step:

Step 31: Receive information about a plurality of transmission nodes corresponding to a first cell or a first BWP configured by a network side for the terminal.

The plurality of transmission nodes are distinguished by using a plurality of different physical transmission node identifiers (for example, Physical Cell Identifier (PCI)) (for example, a working frequency of serving cell-1 (or BWP-1) is f1, and the network side configures, for the terminal, serving cell-1 (or BWP-1) to include a plurality of transmission nodes (for example, PCI-1, PCI-2, PCI-3, and PCI-4).

In some embodiments, the "transmission node physical identifier" includes at least one of the following:

1) a physical cell identifier (for example, PCI-1);

2) a reference signal identifier (for example, a Synchronous Signal Block 1 (SSB-1) and/or a Channel State Information-Reference Signal 1 (CSI-RS-1));

3) a port identifier (for example, port_1) corresponding to a reference signal;

4) a resource location identifier (for example, a Control Resource Set (CORESET) identifier of a Physical Downlink Control Channel (PDCCH), and/or a search space identifier) of a control channel;

5) a reference signal identifier (for example, an SSB identifier and/or a CSI-RS identifier) of the control channel; or 6) a port identifier (for example, port_1) corresponding to the reference signal of the control channel.

In some embodiments of the present disclosure, referring to FIG. 3, before the performing radio link monitoring on at least one first transmission node in the plurality of transmission nodes (that is, step 33 in FIG. 3), the method further includes the following step:

Step 32: Receive configuration information, where the configuration information includes radio link monitoring configuration information of some or all transmission nodes in the plurality of transmission nodes.

In some embodiments, the radio link monitoring configuration information includes at least one of the following:

1) a signal (for example, SSB-1 and/or CSI-RS-1) used for radio link monitoring; or 2) configuration of a timer and/or a counter for radio link monitoring, where the counter includes a counter configured to record an out-of-sync indication and/or a counter configured to record an in-sync indication (for example, a threshold (N310) of a counter n310 configured to record an "out-of-sync", a threshold (N311) of a counter n311 configured to record an "in-sync", and/or a duration (T310) of a timer t310 configured to determine whether the transmission node fails).

The first transmission node may be configured by the network side or agreed on in a protocol.

In this embodiment of the present disclosure, the at least one first transmission node includes at least one of the following: an active transmission node, a primary transmission node, a default transmission node, or all transmission nodes.

The default transmission node is, for example, a transmission node that is always in an active state in the cell, or a transmission node that sends a control channel.

For example, if the network side configures four transmission nodes for the PCell, where only two transmission nodes are active, the UE performs radio link monitoring on the two active transmission nodes (that is, the first transmission nodes) of the PCell.

In another example, if the network side configures four transmission nodes for the PCell, where one transmission node 1 is specified by the network side or agreed on in protocol as a primary transmission node (or a default transmission node), the UE performs radio link monitoring on the transmission node 1 of the PCell (that is, the first transmission node).

In another example, if the network side configures four transmission nodes for the PCell, the UE performs radio link monitoring on the four transmission nodes of the PCell.

The first cell may be configured by the network side or agreed on in a protocol.

In this embodiment of the present disclosure, the first cell is at least one of the following: a primary cell (Pcell) or a primary secondary cell (PScell).

The first BWP may be configured by the network side or agreed on in a protocol.

In this embodiment of the present disclosure, the first BWP is at least one of the following: a primary BWP, an initial BWP, a default BWP, or an active BWP.

The default BWP is, for example, a BWP that is always in an active state in the cell, a BWP that cells the control channel, or a target BWP when the UE proactively changes the BWP.

Figure 4:
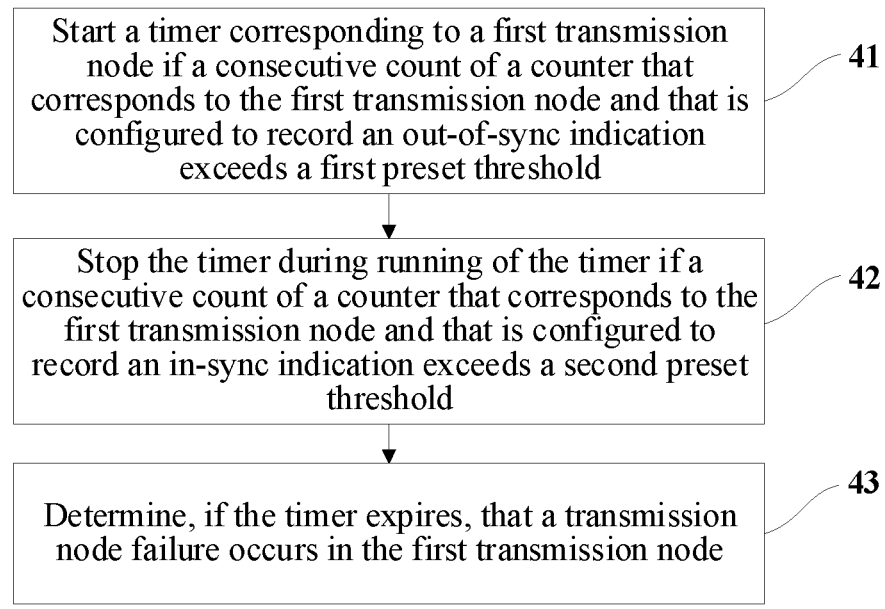
FIG. 4 is a schematic flowchart of a radio link monitoring method according to Embodiment 3 of the present disclosure.

In this embodiment of the present disclosure, referring to FIG. 4, the performing radio link monitoring on at least one first transmission node in the plurality of transmission nodes includes the following steps:

Step 41: Start a timer corresponding to the first transmission node if a consecutive count of a counter that corresponds to the first transmission node and that is configured to record an out-of-sync indication exceeds a first preset threshold. The timer is used to time a duration during which no in-sync indication is received after a first preset threshold of out-of-sync indications are consecutively received.

Step 42: Stop the timer during running of the timer if a consecutive count of a counter that corresponds to the first transmission node and that is configured to record an in-sync indication exceeds a second preset threshold.

Step 43: Determine, if the timer expires, that a transmission node failure occurs in the first transmission node.

For example, if it is specified by the network side or agreed on in a protocol that the UE performs radio link monitoring on the transmission node 1 of the PCell, after a consecutive count of a counter that corresponds to the transmission node 1 and that is configured to record an out-of-sync indication ("out-of-sync") reaches N310 (the first preset threshold) that configured, the UE starts the T310 timer corresponding to the transmission node 1. During running of the T310 timer, if the UE receives that a consecutive count of a counter that corresponds to the transmission node 1 and that is configured to record an in-sync indication ("in-sync") exceeds N311 (second preset threshold), the UE stops the T310 timer. If the T310 timer expires, the UE considers a "transmission node failure" occurs in the transmission node 1.

In this embodiment of the present disclosure, the performing radio link monitoring on at least one first transmission node in the plurality of transmission nodes includes at least one of the following:

1) Reset the timer and/or the counter of the first transmission node for radio link monitoring if radio link monitoring reconfiguration information of the first transmission node is received.

For example, if the network side reconfigures radio link monitoring configuration of transmission node-1, the UE resets the N310 counter (which, for example, is set to "0"), resets the N311 counter (which, for example, is set to 0), or resets the T310 timer (for example, stops the T310 timer if the T310 timer is running).

2) Reset the timer and/or the counter of the first transmission node for radio link monitoring if the first transmission node is no longer used as a transmission node for radio link monitoring.

If the first wireless transmission node for radio link monitoring is changed, the first wireless transmission node is no longer used as the transmission node used for radio link monitoring.

For example, for a case in which radio link monitoring is performed on only an active transmission node, the network side changes the active transmission node.

In another example, for a case in which radio link monitoring is performed on only a primary (or default) transmission node, the network side changes the primary (default) transmission node.

In another example, for a case in which radio link monitoring is performed on all transmission nodes of the first cell, the network side changes the configured transmission node (for example, deletes the transmission node 1).

3) Reset the timer and/or the counter of the first transmission node for radio link monitoring if the first cell corresponding to the first transmission node is deactivated.

For example, the network side deactivates the SCell-1.

4) Reset the timer and/or the counter of the first transmission node for radio link monitoring if the first BWP corresponding to the first transmission node is deactivated.

The counter includes a counter configured to record an out-of-sync indication and/or a counter configured to record an in-sync indication.

For example, the active BWP of the UE changes from BWP-1 to BWP-2, the UE resets a timer and/or a counter that correspond or corresponds to BWP-1 and that correspond or corresponds to radio link monitoring on the transmission node 1 for radio link monitoring.

A method about how to perform processing when a failure of a transmission node is detected is described below.

In this embodiment of the present disclosure, referring to FIG. 3, after the performing radio link monitoring on at least one first transmission node in the plurality of transmission nodes (that is, step 33 in FIG. 3), the method further includes the following step:

Step 34: Perform a transmission node recovery process if it is determined that a transmission node failure occurs in the first transmission node.

In this embodiment of the present disclosure, the transmission node recovery process includes at least one of the following:

1) Trigger connection re-establishment if the first cell has only one first transmission node, and the first cell is a primary cell.

2) Trigger secondary cell group failure reporting if the first cell has only one first transmission node, and the first cell is a primary secondary cell.

The terminal may report secondary cell group failure information through a Master cell group (MCG).

3) Change another transmission node of the first cell or the first BWP into a working or active transmission node if the first cell or the first BWP has only one first transmission node.

4) Change another BWP into a working or active BWP if the first BWP has only one first transmission node, and the first BWP is a working or active BWP.

5) Report transmission node failure information if the first cell or the first BWP has a plurality of first transmission nodes, and the transmission node failure occurs in only some transmission nodes in the plurality of first transmission nodes.

6) Change another transmission node of the first cell or the first BWP into a working or active transmission node if the first cell or the first BWP has a plurality of first transmission nodes, the transmission node failure occurs in only some transmission nodes in the plurality of first transmission node, and the transmission nodes are working or active transmission nodes.

7) Change another BWP into a working or active BWP if the first BWP has a plurality of first transmission nodes, the transmission node failure occurs in only some transmission nodes in the plurality of first transmission nodes, and the first BWP is a working or active BWP.

8) Trigger connection re-establishment if the first cell has a plurality of first transmission nodes, the transmission node failure occurs in all of the plurality of first transmission nodes, and the first cell is a primary cell.

9) Trigger secondary cell group failure reporting if the first cell has a plurality of first transmission nodes, the transmission node failure occurs in all of the plurality of first transmission nodes, and the first cell is a primary secondary cell.

In this embodiment of the present disclosure, after step 34 (the transmission node recovery process is performed), the method further includes the following step:

Step 35: Stop the transmission node recovery process if at least one of the following cases exists:

1) A network side device deactivates the first cell corresponding to the first transmission node in which the transmission node failure occurs.

2) The network side device deactivates the first BWP corresponding to the first transmission node in which the transmission node failure occurs;

3) The network side device changes the first transmission node in which the transmission node failure occurs.

4) The network side device deletes the first cell corresponding to the first transmission node in which the transmission node failure occurs.

5) A network side triggers a cell handover process.

6) The network side device triggers a secondary cell group change process.

For example, when an SCG change occurs, the UE stops a transmission node recovery process on the cell corresponding to the SCG.

7) The network side device changes the first cell corresponding to the first transmission node in which the transmission node failure occurs.

For example, a cell corresponding to the first transmission node in which the transmission node failure occurs is a PCell, and the network side changes the PCell from cell 1 to cell 2.

8) The network side device changes the first BWP corresponding to the first transmission node in which the transmission node failure occurs.

Figure 5:
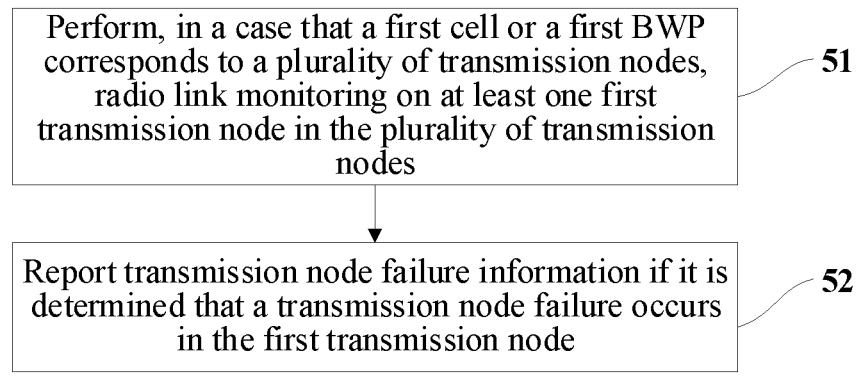
FIG. 5 is a schematic flowchart of a radio link monitoring method according to Embodiment 4 of the present disclosure.

In this embodiment of the present disclosure, referring to FIG. 5, after the performing radio link monitoring on at least one first transmission node in the plurality of transmission nodes (that is, step 51), the method further includes the following step:

Step 52: Report transmission node failure information if it is determined that a transmission node failure occurs in the first transmission node.

In some embodiments, the transmission node failure information includes at least one of the following:

1) An identifier (for example, cell-1) of a cell in which the transmission node failure occurs.

2) A type (for example, the PCell or the PSCell) of the cell in which the transmission node failure occurs.

3) A cell group (for example, the MCG or the SCG) in which the transmission node failure occurs.

4) An identifier (for example, PCI-1 of the PSCell) of the first transmission node in which the transmission node failure occurs.

5) An identifier (for example, BWP-1) of a BWP in which the transmission node failure occurs.

6) A measurement result corresponding to the first transmission node in which the transmission node failure occurs.

The measurement result includes at least one of the following: Reference Signal Received Power (RSRP), Reference Signal Received Quality (RSRQ), a Received Signal Strength Indicator (RSSI), or a Channel Occupancy Ratio (CR):

for example, RSRP, RSRQ, RSSI, or CR of PCI-1 of the PSCell.

7) A measurement result corresponding to a serving cell in which no transmission node failure occurs.

The measurement result includes at least one of the following: reference signal received strength, reference signal received quality, a reference signal quality indicator, or a channel occupancy ratio:

for example, the RSRP/RSRQ/RSSI/CR of the SCell.

8) An identifier of an available transmission node in which no transmission node failure occurs.

For example, the network side configures three transmission nodes for the UE. A transmission node 1 and a transmission node 2 are working transmission nodes. If a transmission node failure occurs in the transmission node 1, the UE reports the transmission node 2 to the network side.

9) A measurement result of the available first transmission node in which no transmission node failure occurs.

10) A measurement result corresponding to a neighbor cell or a non-serving cell:

for example, the RSRP/RSRQ/RSSI/CR of cell-1.

In this embodiment of the present disclosure, after step 52 (the reporting transmission node failure information) includes the following step:

Step 52A: Trigger a process of reporting a resource request if no available uplink resource is configured to report the transmission node failure information.

In some embodiments, the process of reporting a resource request includes at least one of the following:

1) Send a Scheduling Request (SR).

2) Send a random access request (for example, Physical Random Access Channel (PRACH) or MsgA).

In this embodiment of the present disclosure, after step 222 (the reporting transmission node failure information) includes the following step:

step 52B: Report the transmission node failure information through a cell in which no transmission node failure occurs, a BWP in which no transmission node failure occurs, or a transmission node in which no transmission node failure occurs.

In this embodiment of the present disclosure, after step 222 (the reporting transmission node failure information) includes the following step:

Step 52C: Stop a failure recovery process of the first transmission node if it is determined that the transmission node failure information is successfully sent.

In some embodiments, a condition for determining that the transmission node failure information is successfully sent includes at least one of the following:

1) Send the transmission node failure information for the first time.

2) Receive reception acknowledgment information for the transmission node failure information (for example, receive sending acknowledgment information corresponding to a HARQ process in which the transmission node failure information is sent).

In some embodiments, the sending a random access request includes: initiating a random access request in a target transmission node or a target BWP, where the target transmission node is a working or active transmission node after a change; and the target BWP is a working or active BWP after the change.

For examples, for 3), 4), 5), or 6) in the foregoing transmission node recovery process, the UE triggers a random access process on the target transmission node or the target BWP.

In this embodiment of the present disclosure, after step 52 (reporting transmission node failure information) includes the following steps:

Step 521: Send indication information to a network side device, where the indication information is used for indicating that the terminal has the transmission node failure information.

Step 522: Receive request information sent by the network side device, where the request information is used for requesting the terminal to report the transmission node failure information.

Step 523: Report the transmission node failure information according to the request information.

In this embodiment of the present disclosure, after the transmission node failure occurs in the first transmission node, instead of directly reporting the transmission node failure information, the terminal performs reporting according to a request from the network side, which saves network resources.

Through the radio link monitoring method provided in the foregoing embodiments, when a plurality of transmission nodes are configured for the first cell or the first BWP of the UE, radio link monitoring can be performed on at least one transmission node in the plurality of transmission nodes, and corresponding processing can be performed in a case a failure occurs in the corresponding transmission node, thereby reducing data loss and a transmission delay.

Referring to FIG. 6, the embodiments of the present disclosure further provide a radio link monitoring method, performed by a network side device, including the following step:

Step 61: Send first indication information to a terminal, where the first indication information is used for indicating a first transmission node for radio link monitoring, and the first transmission node is at least one of a plurality of transmission nodes corresponding to a first cell or a first BWP.

In the embodiments of the present disclosure, a radio link monitoring manner when one serving cell or BWP corresponds to a plurality of transmission nodes is clarified, so that the terminal side and the network side have the same understanding, thereby ensuring the normal execution of the subsequent communication procedure.

In some embodiments of the present disclosure, referring to FIG. 7, before the sending first indication information to a terminal (step 73), the method further includes the following step:

Step 71: Configure information about a plurality of transmission nodes corresponding to a first cell or a first BWP for the terminal.

The plurality of transmission nodes are distinguished by using a plurality of different physical transmission node identifiers (for example, Physical Cell Identifier (PCI)) (for example, a working frequency of serving cell-1 (or BWP-1) is f1, and the network side configures, for the terminal, serving cell-1 (or BWP-1) to include a plurality of transmission nodes (for example, PCI-1, PCI-2, PCI-3, and PCI-4).

In some embodiments, the "transmission node physical identifier" includes at least one of the following:

1) a physical cell identifier (for example, PCI-1);

2) a reference signal identifier (for example, a Synchronous Signal Block 1 (SSB-1) and/or a Channel State Information-Reference Signal 1 (CSI-RS-1));

3) a port identifier (for example, port_1) corresponding to a reference signal;

4) a resource location identifier (for example, a Control Resource Set (CORESET) identifier of a Physical Downlink Control Channel (PDCCH), and/or a search space identifier) of a control channel;

5) a reference signal identifier (for example, an SSB identifier and/or a CSI-RS identifier) of the control channel; or 6) a port identifier (for example, port_1) corresponding to the reference signal of the control channel.

In some embodiments of the present disclosure, referring to FIG. 7, before step 73 (sending first indication information to a terminal), the method further includes the following step:

Step 72: Send configuration information to the terminal, where the configuration information includes radio link monitoring configuration information of some or all transmission nodes in the plurality of transmission nodes.

In some embodiments, the radio link monitoring configuration information includes at least one of the following:

a signal used for radio link monitoring; or configuration of a timer and/or a counter for radio link monitoring, where the counter includes a counter configured to record an out-of-sync indication and/or a counter configured to record an in-sync indication.

In this embodiment of the present disclosure, the first transmission node includes at least one of the following: an active transmission node, a primary transmission node, a default transmission node, or all transmission nodes of the first cell or the first BWP.

The default transmission node is, for example, a transmission node that is always in an active state in the cell, or a transmission node that sends a control channel.

For example, if the network side configures four transmission nodes for the PCell, where only two transmission nodes are active, the UE performs radio link monitoring on the two active transmission nodes (that is, the first transmission nodes) of the PCell.

In another example, if the network side configures four transmission nodes for the PCell, where one transmission node 1 is specified by the network side or agreed on in protocol as a primary transmission node (or a default transmission node), the UE performs radio link monitoring on the transmission node 1 of the PCell (that is, the first transmission node).

In another example, if the network side configures four transmission nodes for the PCell, the UE performs radio link monitoring on the four transmission nodes of the PCell.

The first cell may be configured by the network side or agreed on in a protocol.

In this embodiment of the present disclosure, the first cell is at least one of the following: a primary cell (Pcell) or a primary secondary cell (PScell).

The first BWP may be configured by the network side or agreed on in a protocol.

In this embodiment of the present disclosure, the first BWP is at least one of the following: a primary BWP, an initial BWP, a default BWP, or an active BWP.

The default BWP is, for example, a BWP that is always in an active state in the cell, a BWP that cells the control channel, or a target BWP when the UE proactively changes the BWP.

In some embodiments of the present disclosure, referring to FIG. 7, after step 73 (sending first indication information to a terminal), the method further includes the following step:

Step 74: Receive transmission node failure information.

In some embodiments, the transmission node failure information includes at least one of the following:

an identifier of a cell in which the transmission node failure occurs;

a type of the cell in which the transmission node failure occurs;

a cell group in which the transmission node failure occurs;

an identifier of the first transmission node in which the transmission node failure occurs;

an identifier of a BWP in which the transmission node failure occurs;

a measurement result corresponding to the first transmission node in which the transmission node failure occurs;

a measurement result corresponding to a serving cell in which no transmission node failure occurs;

an identifier of an available transmission node in which no transmission node failure occurs;

a measurement result of the available first transmission node in which no transmission node failure occurs; or a measurement result corresponding to a neighbor cell or a non-serving cell.

In some embodiments, the measurement result includes at least one of the following: reference signal received strength, reference signal received quality, a reference signal quality indicator, or a channel occupancy ratio.

Figure 8:
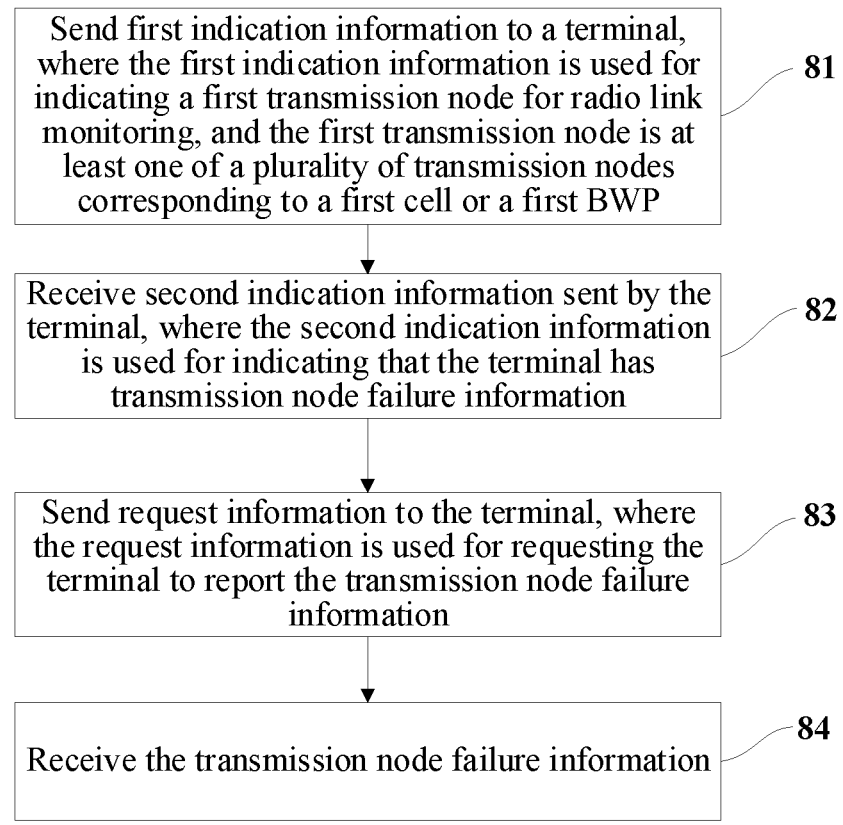
FIG. 8 is a schematic flowchart of a radio link monitoring method according to Embodiment 7 of the present disclosure.

In some embodiments of the present disclosure, referring to FIG. 8, after the sending first indication information to a terminal (step 81), the method further includes the following steps:

Step 82: Receive second indication information sent by the terminal, where the second indication information is used for indicating that the terminal has the transmission node failure information.

Step 83: Send request information to the terminal, where the request information is used for requesting the terminal to report the transmission node failure information.

Step 84: Receive transmission node failure information.

In some embodiments of the present disclosure, after the receiving transmission node failure information in the foregoing embodiment, the method further includes the following steps:

performing at least one of the following handling behaviors:

deactivating the first cell corresponding to the first transmission node in which the transmission node failure occurs;

deactivating the first BWP corresponding to the first transmission node in which the transmission node failure occurs;

changing the first transmission node;

deleting, by the network side device, the first cell corresponding to the first transmission node in which the transmission node failure occurs;

triggering a cell handover process;

triggering a secondary cell group change process (for example, when an SCG change occurs, the UE stops a transmission node recovery process on the cell corresponding to the SCG);

changing the first cell corresponding to the first transmission node (for example, a cell of the network side for monitoring the transmission node failure is a PCell, and the network side changes the PCell from cell 1 to cell 2); or changing the first BWP corresponding to the first transmission node.

Through the radio link monitoring method provided in the foregoing embodiments, when a plurality of transmission nodes are configured for the first cell or the first BWP of the UE, radio link monitoring can be performed on at least one transmission node in the plurality of transmission nodes, and corresponding processing can be performed in a case a failure occurs in the corresponding transmission node, thereby reducing data loss and a transmission delay.

Figure 9:
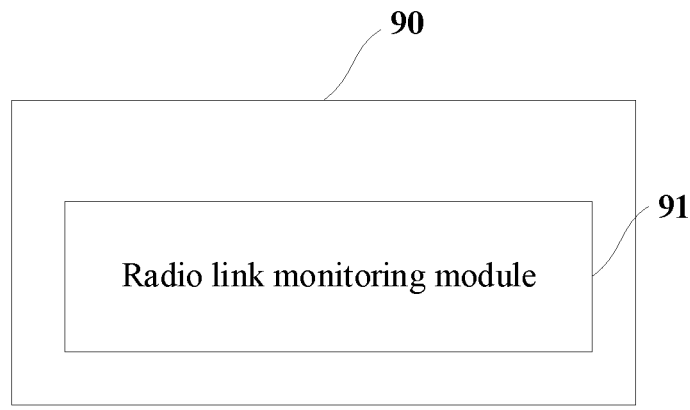
FIG. 9 is a schematic structural diagram of a terminal according to an embodiment of the present disclosure.

Referring to FIG. 9, the embodiments of the present disclosure further provide a terminal 90, including:

a radio link monitoring module 91, configured to perform, in a case that a first cell or a first BWP corresponds to a plurality of transmission nodes, radio link monitoring on at least one first transmission node in the plurality of transmission nodes.

In the embodiments of the present disclosure, a radio link monitoring manner when one serving cell or BWP corresponds to a plurality of transmission nodes is clarified, so that the terminal side and the network side have the same understanding, thereby ensuring the normal execution of the subsequent communication procedure.

In some embodiments, the terminal 90 further includes:

a receiving module, configured to receive configuration information, where the configuration information includes radio link monitoring configuration information of some or all transmission nodes in the plurality of transmission nodes.

In some embodiments, the radio link monitoring configuration information includes at least one of the following:

a signal used for radio link monitoring; or configuration of a timer and/or a counter for radio link monitoring, where the counter includes a counter configured to record an out-of-sync indication and/or a counter configured to record an in-sync indication.

In some embodiments, the at least one first transmission node includes at least one of the following: an active transmission node, a primary transmission node, a default transmission node, or all transmission nodes.

In some embodiments, the first cell is at least one of the following: a primary cell or a primary secondary cell.

In some embodiments, the first BWP is at least one of the following: a primary BWP, an initial BWP, a default BWP, or an active BWP.

In some embodiments, the radio link monitoring module 91 includes:

a starting submodule, configured to start a timer corresponding to the first transmission node if a consecutive count of a counter that corresponds to the first transmission node and that is configured to record an out-of-sync indication exceeds a first preset threshold;

a stopping submodule, configured to stop the timer during running of the timer if a consecutive count of a counter that corresponds to the first transmission node and that is configured to record an in-sync indication exceeds a second preset threshold; and a determining submodule, configured to determine, if the timer expires, that a transmission node failure occurs in the first transmission node.

In some embodiments, the radio link monitoring module 91 is configured to perform at least one of the following:

resetting the timer and/or the counter of the first transmission node for radio link monitoring if radio link monitoring reconfiguration information of the first transmission node is received;

resetting the timer and/or the counter of the first transmission node for radio link monitoring if the first transmission node is no longer used as a transmission node for radio link monitoring;

resetting the timer and/or the counter of the first transmission node for radio link monitoring if the first cell corresponding to the first transmission node is deactivated; or resetting the timer and/or the counter of the first transmission node for radio link monitoring if the first BWP corresponding to the first transmission node is deactivated, where the counter includes a counter configured to record an out-of-sync indication and/or a counter configured to record an in-sync indication.

In some embodiments, the terminal 90 further includes:

an execution module, configured to perform a transmission node recovery process if it is determined that a transmission node failure occurs in the first transmission node.

In some embodiments, the transmission node recovery process includes at least one of the following:

triggering connection re-establishment if the first cell has only one first transmission node, and the first cell is a primary cell;

triggering secondary cell group failure reporting if the first cell has only one first transmission node, and the first cell is a primary secondary cell;

changing another transmission node of the first cell or the first BWP into a working or active transmission node if the first cell or the first BWP has only one first transmission node;

changing another BWP into a working or active BWP if the first BWP has only one first transmission node, and the first BWP is a working or active BWP;

reporting transmission node failure information if the first cell or the first BWP has a plurality of first transmission nodes, and the transmission node failure occurs in only some transmission nodes in the plurality of first transmission nodes;

changing another transmission node of the first cell or the first BWP into a working or active transmission node if the first cell or the first BWP has a plurality of first transmission nodes, the transmission node failure occurs in only some transmission nodes in the plurality of first transmission node, and the transmission nodes are working or active transmission nodes;

changing another BWP into a working or active BWP if the first BWP has a plurality of first transmission nodes, the transmission node failure occurs in only some transmission nodes in the plurality of first transmission nodes, and the first BWP is a working or active BWP;

triggering connection re-establishment if the first cell has a plurality of first transmission nodes, the transmission node failure occurs in all of the plurality of first transmission nodes, and the first cell is a primary cell; or triggering secondary cell group failure reporting if the first cell has a plurality of first transmission nodes, the transmission node failure occurs in all of the plurality of first transmission nodes, and the first cell is a primary secondary cell.

In some embodiments, the terminal 90 further includes:

a first stopping module, configured to stop the transmission node recovery process if at least one of the following cases exists:

a network side device deactivates the first cell corresponding to the first transmission node in which the transmission node failure occurs;

the network side device deactivates the first BWP corresponding to the first transmission node in which the transmission node failure occurs;

the network side device changes the first transmission node in which the transmission node failure occurs;

the network side device deletes the first cell corresponding to the first transmission node in which the transmission node failure occurs;

a network side triggers a cell handover process;

the network side device triggers a secondary cell group change process;

the network side device changes the first cell corresponding to the first transmission node in which the transmission node failure occurs; or the network side device changes the first BWP corresponding to the first transmission node in which the transmission node failure occurs.

In some embodiments, the terminal 90 further includes:

a reporting module, configured to report transmission node failure information if it is determined that a transmission node failure occurs in the first transmission node.

In some embodiments, the transmission node failure information includes at least one of the following:

an identifier of a cell in which the transmission node failure occurs;

a type of the cell in which the transmission node failure occurs;

a cell group in which the transmission node failure occurs;

an identifier of the first transmission node in which the transmission node failure occurs;

an identifier of a BWP in which the transmission node failure occurs;

a measurement result corresponding to the first transmission node in which the transmission node failure occurs;

a measurement result corresponding to a serving cell in which no transmission node failure occurs;

an identifier of an available transmission node in which no transmission node failure occurs;

a measurement result of the available first transmission node in which no transmission node failure occurs; or a measurement result corresponding to a neighbor cell or a non-serving cell.

In some embodiments, the measurement result includes at least one of the following: reference signal received strength, reference signal received quality, a reference signal quality indicator, or a channel occupancy ratio.

In some embodiments, the reporting module is configured to trigger a process of reporting a resource request if no available uplink resource is configured to report the transmission node failure information.

In some embodiments, the process of reporting a resource request includes at least one of the following:

sending a scheduling request; or sending a random access request.

In some embodiments, the reporting module is configured to report the transmission node failure information through a cell in which no transmission node failure occurs, a BWP in which no transmission node failure occurs, or a transmission node in which no transmission node failure occurs.

In some embodiments, the terminal 90 further includes:

a second stopping module, configured to stop a failure recovery process of the first transmission node if it is determined that the transmission node failure information is successfully sent.

In some embodiments, a condition for determining that the transmission node failure information is successfully sent includes at least one of the following:

sending the transmission node failure information for the first time; or receiving reception acknowledgment information for the transmission node failure information.

In some embodiments, the sending a random access request includes:

initiating a random access request in a target transmission node or a target BWP, where the target transmission node is a working or active transmission node after a change; and the target BWP is a working or active BWP after the change.

In some embodiments, the reporting module includes:

a first sending submodule, configured to send indication information to a network side device, where the indication information is used for indicating that the terminal has the transmission node failure information;

a receiving submodule, configured to receive request information sent by the network side device, where the request information is used for requesting the terminal to report the transmission node failure information; and a second sending submodule, configured to report the transmission node failure information according to the request information.

The terminal provided in this embodiment of the present disclosure can implement various processes implemented by the terminal in the method embodiments of FIG. 2 to FIG. 5. To avoid repetition, details are not described herein again.

Figure 10:
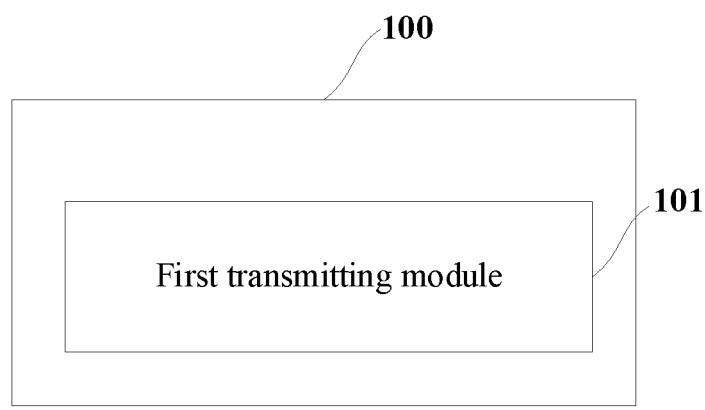
FIG. 10 is a schematic structural diagram of a network side device according to an embodiment of the present disclosure.

Referring to FIG. 10, the embodiments of the present disclosure further provide a network side device 100, including:

a first sending module 101, configured to send first indication information to a terminal, where the first indication information is used for indicating a first transmission node for radio link monitoring, and the first transmission node is at least one of a plurality of transmission nodes corresponding to a first cell or a first BWP.

In the embodiments of the present disclosure, a radio link monitoring manner when one serving cell or BWP corresponds to a plurality of transmission nodes is clarified, so that the terminal side and the network side have the same understanding, thereby ensuring the normal execution of the subsequent communication procedure.

In some embodiments, the network side device 100 further includes:

a second sending module, configured to send configuration information to the terminal, where the configuration information includes radio link monitoring configuration information of some or all transmission nodes in the plurality of transmission nodes.

In some embodiments, the radio link monitoring configuration information includes at least one of the following:

a signal used for radio link monitoring; or configuration of a timer and/or a counter for radio link monitoring, where the counter includes a counter configured to record an out-of-sync indication and/or a counter configured to record an in-sync indication.

In some embodiments, the first transmission node includes at least one of the following: an active transmission node, a primary transmission node, a default transmission node, or all transmission nodes of the first cell or the first BWP.

In some embodiments, the first cell is at least one of the following: a primary cell or a primary secondary cell.

In some embodiments, the first BWP is at least one of the following: a primary BWP, an initial BWP, a default BWP, or an active BWP.

In some embodiments, the network side device 100 further includes:

a first receiving module, configured to receive transmission node failure information.

In some embodiments, the transmission node failure information includes at least one of the following:

an identifier of a cell in which the transmission node failure occurs;

a type of the cell in which the transmission node failure occurs;

a cell group in which the transmission node failure occurs;

an identifier of the first transmission node in which the transmission node failure occurs;

an identifier of a BWP in which the transmission node failure occurs;

a measurement result corresponding to the first transmission node in which the transmission node failure occurs;

a measurement result corresponding to a serving cell in which no transmission node failure occurs;

an identifier of an available transmission node in which no transmission node failure occurs;

a measurement result of the available first transmission node in which no transmission node failure occurs; or a measurement result corresponding to a neighbor cell or a non-serving cell.

In some embodiments, the measurement result includes at least one of the following: reference signal received strength, reference signal received quality, a reference signal quality indicator, or a channel occupancy ratio.

In some embodiments, the network side device 100 further includes:

a second receiving module, configured to receive second indication information sent by the terminal, where the second indication information is used for indicating that the terminal has the transmission node failure information; and a third sending module, configured to send request information to the terminal, where the request information is used for requesting the terminal to report the transmission node failure information.

In some embodiments, the network side device 100 further includes:

an execution module, configured to perform at least one of the following processing behaviors after the transmission node failure information is received:

deactivating the first cell corresponding to the first transmission node in which the transmission node failure occurs;

deactivating the first BWP corresponding to the first transmission node in which the transmission node failure occurs;

changing the first transmission node;

deleting, by the network side device, the first cell corresponding to the first transmission node in which the transmission node failure occurs;

triggering a cell handover process;

triggering a secondary cell group change process;

changing the first cell corresponding to the first transmission node; or changing the first BWP corresponding to the first transmission node.

The terminal provided in this embodiment of the present disclosure can implement various processes implemented by the network side device in the method embodiments of FIG. 6 to FIG. 8. To avoid repetition, details are not described herein again.

Figure 11:
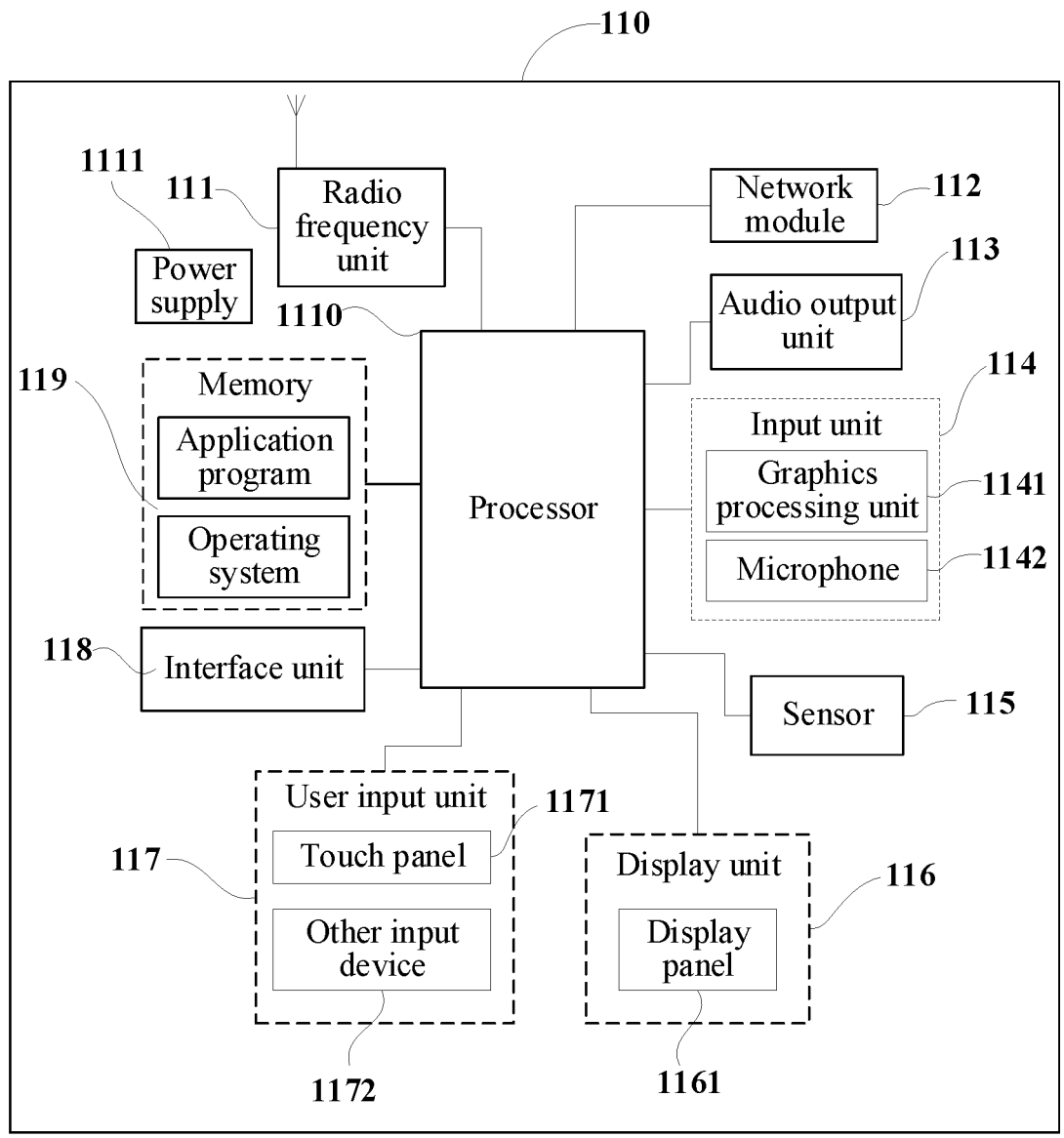
FIG. 11 is a schematic structural diagram of a terminal according to another embodiment of the present disclosure.

FIG. 11 is a schematic structural diagram of a terminal according to embodiments of the present disclosure. The terminal 110 includes, but is not limited to, components such as a radio frequency unit 111, a network module 112, an audio output unit 113, an input unit 114, a sensor 115, a display unit 116, a user input unit 117, an interface unit 118, a memory 119, a processor 1110, and a power supply 1111. A person skilled in the art may understand that a terminal structure shown in FIG. 11 constitutes no limitation on the terminal, and the terminal may include more or fewer components than those shown in the figure, or some components may be combined, or a different component deployment may be used. In the embodiments of the present disclosure, the method includes, but is not limited to, a mobile phone, a tablet computer, a notebook computer, a palmtop computer, an in-vehicle terminal, a wearable device, a pedometer, and the like.

The processor 1110 is configured to perform, in a case that a first cell or a first BWP corresponds to a plurality of transmission nodes, radio link monitoring on at least one first transmission node in the plurality of transmission nodes.

In the embodiments of the present disclosure, a radio link monitoring manner when one serving cell or BWP corresponds to a plurality of transmission nodes is clarified, so that the terminal side and the network side have the same understanding, thereby ensuring the normal execution of the subsequent communication procedure.

The terminal provided in this embodiment of the present disclosure can implement various processes implemented by the terminal in the method embodiments of FIG. 2 to FIG. 5. To avoid repetition, details are not described herein again.

It should be understood that, in the embodiments of the present disclosure, the radio frequency unit 111 may be configured to receive and transmit information or receive and transmit signals during a call. In some embodiments, after being received, downlink data from a base station is processed by the processor 1110. In addition, uplink data is sent to the base station. Generally, the radio frequency unit 111 includes, but is not limited to, an antenna, at least one amplifier, a transceiver, a coupler, a low noise amplifier, a duplexer, and the like. In addition, the radio frequency unit 111 may further communicate with another device through a wireless communication system and network.

The terminal provides wireless broadband Internet access for a user through the network module 112, for example, help the user to send and receive emails, browse webpages, and access stream media, and the like.

The audio output unit 113 may convert audio data received by the radio frequency unit 111 or network module 112 or audio data stored on the memory 119 into audio signals and output the audio signals as sounds. Moreover, the audio output unit 113 may further provide an audio output (for example, a call signal receiving sound or a message receiving sound) related to a specific function implemented by the terminal 110. The audio output unit 113 includes a speaker, a buzzer, a receiver, and the like.

The input unit 114 is configured to receive an audio signal or a video signal. The input unit 114 may include a Graphics Processing Unit (GPU) 1141 and a microphone 1142. The graphics processing unit 1141 processes image data of a static picture or a video obtained by an image capturing apparatus (for example, a camera) in a video capturing mode or an image capturing mode. The processed image frame may be displayed on the display unit 116. The image frame that has been processed by the graphics processing unit 1141 may be stored on the memory 119 (or another storage medium) or sent by using the radio frequency unit 111 or network module 112. The microphone 1142 may receive a sound, and can process the sound into audio data. The processed audio data may be converted, in a phone call mode, into a format that may be sent to a mobile communication base station via the radio frequency unit 111 and be output.

The terminal 110 further includes at least one sensor 115 such as an optical sensor, a motion sensor, and another sensor. In some embodiments, the optical sensor includes an ambient light sensor and a proximity sensor. The ambient light sensor may adjust luminance of the display panel 1161 according to the luminance of the ambient light, and the proximity sensor may switch off the display panel 1161 and/or backlight when the terminal 110 is moved to the ear. As a type of motion sensor, an acceleration sensor can monitor magnitudes of accelerations in various directions (generally, on three axes), may detect a magnitude and a direction of the gravity in a static state, and may be applied to recognizing an attitude of the terminal (for example, switching between landscape orientation and portrait orientation, a related game, and magnetometer attitude calibration), a function related to vibration recognition (such as a pedometer and a knock), and the like. The sensor 115 may further include a fingerprint sensor, a pressure sensor, an iris sensor, a molecular sensor, a gyroscope, a barometer, a hygrometer, a thermometer, an infrared sensor, and the like, and details are not described herein.

The display unit 116 is configured to display information entered by the user or information provided for the user. The display unit 116 may include a display panel 1161. The display panel 1161 may be configured in a form of a liquid crystal display (LCD), an organic light-emitting diode (OLED), or the like.

The user input unit 117 may be configured to receive input digit or character information, and generate key signal input related to the user setting and function control of the terminal. In some embodiments, the user input unit 117 includes a touch panel 1171 and another input device 1172. The touch panel 1171, also referred to as a touchscreen, may collect a touch operation of a user on or near the touch panel (such as an operation of a user on or near the touch panel 1171 by using any suitable object or attachment, such as a finger or a touch pen). The touch panel 1171 may include two parts: a touch monitoring apparatus and a touch controller. The touch detection apparatus detects a touch orientation of the user, detects a signal brought by the touch operation, and transmits the signal to the touch controller. The touch controller receives touch information from the touch monitoring apparatus, converts the touch information into a contact coordinate, then transmits the contact coordinate to the processor 1110, and receives and executes a command transmitted by the processor 1110. In addition, the touch panel 1171 may be implemented by using various types, such as a resistive type, a capacitive type, an infrared type, and a surface acoustic wave type. In addition to the touch panel 1171, the user input unit 117 may further include the another input device 1172. In some embodiments, the another input device 1172 may include, but not limited to, a physical keyboard, a functional key (such as a volume control key or a switch key), a track ball, a mouse, and a joystick, which is not described herein in detail.

Further, the touch panel 1171 may cover the display panel 1161. After detecting a touch operation on or near the touch panel 1171, the touch panel transfers the touch operation to the processor 1110, so as to determine a type of the touch event. Then, the processor 1110 provides corresponding visual output on the display panel 1161 according to the type of the touch event. Although, in FIG. 11, the touch panel 1171 and the display panel 1161 are used as two separate parts to implement input and output functions of the terminal, in some embodiments, the touch panel 1171 and the display panel 1161 may be integrated to implement the input and output functions of the terminal. Details are not limited herein.

The interface unit 118 is an interface between an external apparatus and the terminal 110. For example, the external apparatus may include a wired or wireless headset port, an external power supply (or a battery charger) port, a wired or wireless data port, a storage card port, a port used to connect an apparatus having an identification module, an audio input/output (I/O) port, a video I/O port, an earphone port, and the like. The interface unit 118 may be configured to receive an input (such as data information or electric power)

from an external apparatus and transmit the received input to one or more elements in the terminal 110 or may be configured to transmit data between the terminal 110 and the external apparatus.

The memory 119 may be configured to store a software program and various data. The memory 119 may mainly include a program storage region and a data storage region. The program storage region may store an operating system, an application required by at least one function (for example, a sound playback function or an image playback function), and the like. The data storage region may store data (for example, audio data and a phone book) created according to use of the mobile phone. In addition, the memory 119 may include a high speed random access memory, and may further include a non-volatile memory, such as at least one magnetic disk storage device, a flash memory device, or other non-volatile solid state storage devices.

The processor 1110 is a control center of the terminal, and connects to various parts of the terminal by using various interfaces and lines. By running or executing the software program and/or module stored in the memory 119, and invoking data stored in the memory 119, the processor performs various functions and data processing of the terminal, thereby performing overall monitoring on the terminal. In some embodiments, the processor 1110 may include one or more processing units. In some embodiments, the processor 1110 may integrate an application processor and a modem processor. The application processor mainly processes an operating system, a user interface, an application program, and the like. The modem processor mainly processes wireless communication. It may be understood that the modulation and demodulation processor may not be integrated into the processor 1110.

The terminal 110 further includes the power supply 1111 (such as a battery) for supplying power to the components. In some embodiments, the power supply 1111 may be logically connected to the processor 1110 by a power management system, thereby implementing functions, such as charging, discharging, and power consumption management, by using the power management system.

In addition, the terminal 110 includes some function modules that are not shown, which is not described herein in detail.

Figure 12:
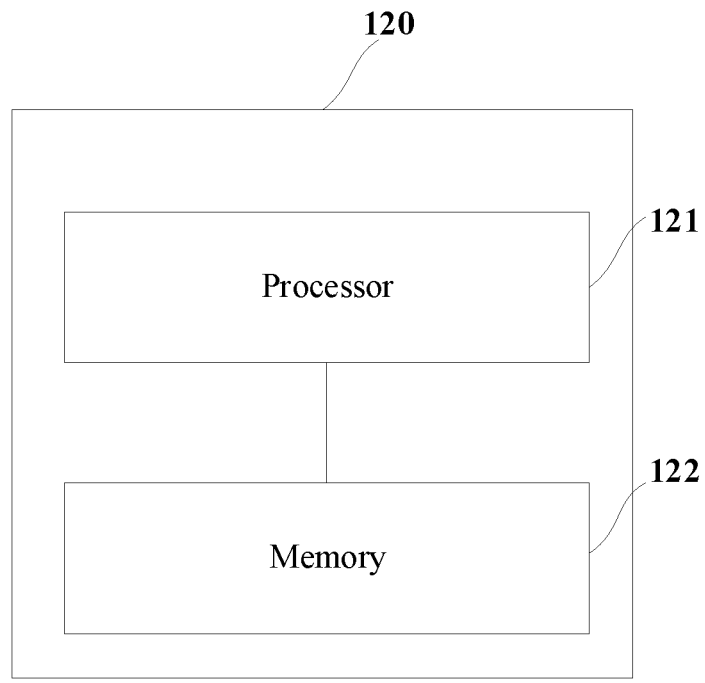
FIG. 12 is a schematic structural diagram of a terminal according to still another embodiment of the present disclosure.

Referring to FIG. 12, the embodiments of the present disclosure further provide a terminal 120, including: a processor 121, a memory 122, and a computer program stored in the memory 122 and executable on the processor 121, where when executed by the processor 121, the computer program implements respective processes of the embodiments of the radio link monitoring method performed by a terminal and can achieve the same technical effects. To avoid repetition, details are not described herein again.

Figure 13:
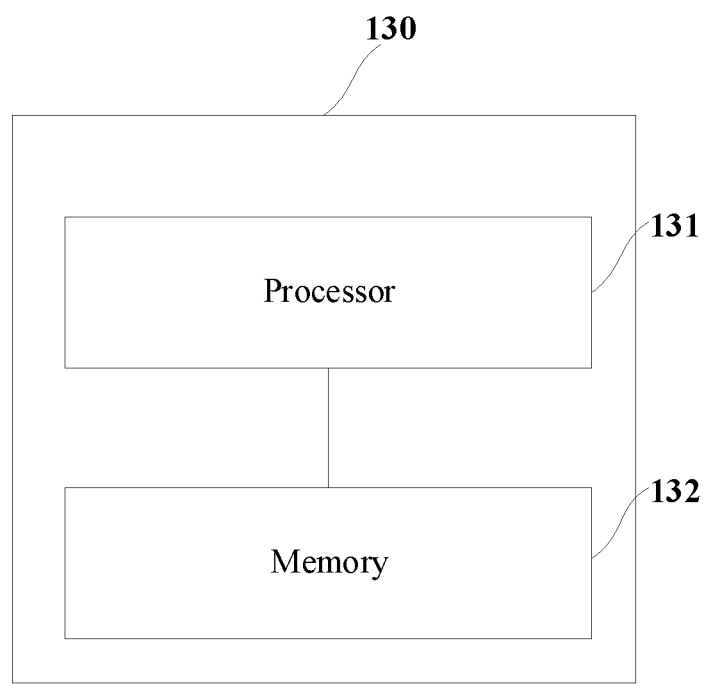
FIG. 13 is a schematic structural diagram of a network side device according to still another embodiment of the present disclosure.

Referring to FIG. 13, the embodiments of the present disclosure further provide a network side device 130, including: a processor 131, a memory 132, and a computer program stored in the memory 132 and executable on the processor 131, where when executed by the processor 131, the computer program implements respective processes of the embodiments of the radio link monitoring method performed by a network side device, and can achieve the same technical effects. To avoid repetition, details are not described herein again.

The embodiments of the present disclosure further provide a computer-readable storage medium, storing a computer program, where when executed by a processor, the computer program implements respective processes of the embodiments of the radio link monitoring method performed by a terminal, and can achieve the same technical effects. To avoid repetition, details are not described herein again.

The embodiments of the present disclosure further provide a computer-readable storage medium, storing a computer program, where when executed by a processor, the computer program implements respective processes of the radio link monitoring method performed by a network side device, and can achieve the same technical effects. To avoid repetition, details are not described herein again.

The computer-readable storage medium may include a read-only memory (ROM), a random access memory (RAM), a magnetic disk, and an optical disc.

It should be noted that terms "include", "comprise", and any variants thereof are intended to cover a non-exclusive inclusion. Therefore, in the context of a process, method, object, or device that includes a series of elements, the process, method, object, or device not only includes such elements, but also includes other elements not specified expressly, or may include inherent elements of the process, method, object, or device. Without more limitations, elements defined by the sentence "including one" does not exclude that there are still other same elements in the processes, methods, objects, or apparatuses.

Through the descriptions of the foregoing implementations, a person skilled in the art may clearly understand that the method according to the foregoing embodiments may be implemented through software and a necessary general hardware platform, and may also be implemented by hardware, but in many cases, the former manner is a better implementation. Based on such an understanding, the technical solutions of the present disclosure essentially, or the part contributing to the prior art, may be presented in the form of a software product. The computer software product is stored in a storage medium (for example, a ROM/RAM, a magnetic disk, or an optical disc) including several instructions to enable a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the foregoing specific implementations. The foregoing specific implementations are merely illustrative rather than limitative. A person of ordinary skill in the art may derive various forms from the present disclosure without departing from the spirit of the present disclosure and the scope claimed by the claims, which are all under the protection of the present disclosure.

What is claimed is:

1. A method for radio link monitoring, performed by a terminal, comprising:
   performing, when a first cell or a first Bandwidth Part (BWP) corresponds to a plurality of transmission nodes, radio link monitoring on at least one first transmission node in the plurality of transmission nodes,
   wherein after the performing radio link monitoring on at least one first transmission node in the plurality of transmission nodes, the method further comprises:
   performing a transmission node recovery process when it is determined that a transmission node failure occurs in the at least one first transmission node; or
   reporting transmission node failure information when it is determined that a transmission node failure occurs in the at least one first transmission node.

2. The method according to claim 1, wherein before the performing radio link monitoring on at least one first transmission node in the plurality of transmission nodes, the method further comprises:
receiving configuration information, wherein the configuration information comprises radio link monitoring configuration information of some or all transmission nodes in the plurality of transmission nodes.

3. The method according to claim 2, wherein the radio link monitoring configuration information comprises at least one of the following:
a signal used for radio link monitoring; or
configuration of a timer or a counter for radio link monitoring, wherein the counter comprises a counter configured to record an out-of-sync indication or a counter configured to record an in-sync indication.

4. The method according to claim 1, wherein:
the at least one first transmission node comprises at least one of an active transmission node, a primary transmission node, a default transmission node, or all transmission nodes;
the first cell is at least one of a primary cell or a primary secondary cell; or
the first BWP is at least one of a primary BWP, an initial BWP, a default BWP, or an active BWP.

5. The method according to claim 1, wherein the performing radio link monitoring on at least one first transmission node in the plurality of transmission nodes comprises:
starting a timer corresponding to the first transmission node when a consecutive count of a counter that corresponds to the first transmission node and that is configured to record an out-of-sync indication exceeds a first preset threshold;
stopping the timer during running of the timer when a consecutive count of a counter that corresponds to the first transmission node and that is configured to record an in-sync indication exceeds a second preset threshold; and
determining, when the timer expires, that a transmission node failure occurs in the first transmission node.

6. The method according to claim 5, wherein the performing radio link monitoring on at least one first transmission node in the plurality of transmission nodes comprises at least one of the following:
resetting the timer or the counter of the first transmission node for radio link monitoring when radio link monitoring reconfiguration information of the first transmission node is received;
resetting the timer or the counter of the first transmission node for radio link monitoring when the first transmission node is no longer used as a transmission node for radio link monitoring;
resetting the timer or the counter of the first transmission node for radio link monitoring when the first cell corresponding to the first transmission node is deactivated; or
resetting the timer or the counter of the first transmission node for radio link monitoring when the first BWP corresponding to the first transmission node is deactivated,
wherein the counter comprises a counter configured to record an out-of-sync indication or a counter configured to record an in-sync indication.

7. The method according to claim 1, wherein the transmission node recovery process comprises at least one of the following:
triggering connection re-establishment when the first cell has only one first transmission node, and the first cell is a primary cell;
triggering secondary cell group failure reporting when the first cell has only one first transmission node, and the first cell is a primary secondary cell;
changing another transmission node of the first cell or the first BWP into a working or active transmission node when the first cell or the first BWP has only one first transmission node;
changing another BWP into a working or active BWP when the first BWP has only one first transmission node, and the first BWP is a working or active BWP;
reporting the transmission node failure information when the first cell or the first BWP has a plurality of first transmission nodes, and the transmission node failure occurs in only some transmission nodes in the plurality of first transmission nodes;
changing another transmission node of the first cell or the first BWP into a working or active transmission node when the first cell or the first BWP has a plurality of first transmission nodes, the transmission node failure occurs in only some transmission nodes in the plurality of first transmission node, and the transmission nodes are working or active transmission nodes;
changing another BWP into a working or active BWP when the first BWP has a plurality of first transmission nodes, the transmission node failure occurs in only some transmission nodes in the plurality of first transmission nodes, and the first BWP is a working or active BWP;
triggering connection re-establishment when the first cell has a plurality of first transmission nodes, the transmission node failure occurs in all of the plurality of first transmission nodes, and the first cell is a primary cell; or
triggering secondary cell group failure reporting when the first cell has a plurality of first transmission nodes, the transmission node failure occurs in all of the plurality of first transmission nodes, and the first cell is a primary secondary cell.

8. The method according to claim 1, wherein after the transmission node recovery process, the method further comprises:
stopping the transmission node recovery process when at least one of the following cases exists:
a network side device deactivates the first cell corresponding to the first transmission node in which the transmission node failure occurs;
the network side device deactivates the first BWP corresponding to the first transmission node in which the transmission node failure occurs;
the network side device changes the first transmission node in which the transmission node failure occurs;
the network side device deletes the first cell corresponding to the first transmission node in which the transmission node failure occurs;
a network side triggers a cell handover process;
the network side device triggers a secondary cell group change process;
the network side device changes the first cell corresponding to the first transmission node in which the transmission node failure occurs; or the network side device changes the first BWP corresponding to the first transmission node in which the transmission node failure occurs.

9. The method according to claim 1, wherein the transmission node failure information comprises at least one of the following:
   an identifier of a cell in which the transmission node failure occurs;
   a type of the cell in which the transmission node failure occurs;
   a cell group in which the transmission node failure occurs;
   an identifier of the first transmission node in which the transmission node failure occurs;
   an identifier of a BWP in which the transmission node failure occurs;
   a measurement result corresponding to the first transmission node in which the transmission node failure occurs;
   a measurement result corresponding to a serving cell in which no transmission node failure occurs;
   an identifier of an available transmission node in which no transmission node failure occurs;
   a measurement result of the available first transmission node in which no transmission node failure occurs; or
   a measurement result corresponding to a neighbor cell or a non-serving cell.

10. The method according to claim 1, wherein the reporting transmission node failure information comprises:
    triggering a process of reporting a resource request when no available uplink resource is configured to report the transmission node failure information,
       wherein the process of reporting a resource request comprises at least one of the following:
       sending a scheduling request; or
       sending a random access request.

11. The method according to claim 1, wherein the reporting transmission node failure information comprises:
    reporting the transmission node failure information through a cell in which no transmission node failure occurs, a BWP in which no transmission node failure occurs, or a transmission node in which no transmission node failure occurs.

12. The method according to claim 1, wherein after the reporting transmission node failure information, the method further comprises:
    stopping a failure recovery process of the first transmission node if it is determined that the transmission node failure information is successfully sent,
       wherein a condition for determining that the transmission node failure information is successfully sent comprises at least one of the following:
       sending the transmission node failure information for the first time; or
       receiving reception acknowledgment information for the transmission node failure information.

13. The method according to claim 10, wherein the sending a random access request comprises:
    initiating a random access request in a target transmission node or a target BWP,
       wherein the target transmission node is a working or active transmission node after a change; and
       the target BWP is a working or active BWP after the change.

14. The method according to claim 1, wherein the reporting transmission node failure information comprises:
    sending indication information to a network side device, wherein the indication information is used for indicating that the terminal has the transmission node failure information;
    receiving request information sent by the network side device, wherein the request information is used for requesting the terminal to report the transmission node failure information; and
    reporting the transmission node failure information according to the request information.

15. A method for radio link monitoring performed by a network side device, comprising:
    sending first indication information to a terminal, wherein the first indication information is used by the terminal for performing, when a first cell or a first Bandwidth Part (BWP) corresponds to a plurality of transmission nodes, radio link monitoring on at least one first transmission node in the plurality of transmission nodes,
    wherein the first indication information is further used by the terminal, after the performing radio link monitoring on at least one first transmission node in the plurality of transmission nodes, for:
       performing a transmission node recovery process when it is determined that a transmission node failure occurs in the at least one first transmission node; or
       reporting transmission node failure information when it is determined that a transmission node failure occurs in the at least one first transmission node.

16. The method according to claim 15, further comprising:
    sending configuration information to the terminal, wherein the configuration information comprises radio link monitoring configuration information of some or all transmission nodes in the plurality of transmission nodes.

17. The method according to claim 16, wherein the radio link monitoring configuration information comprises at least one of the following:
    a signal used for radio link monitoring; or
    configuration of a timer or a counter for radio link monitoring, wherein the counter comprises a counter configured to record an out-of-sync indication or a counter configured to record an in-sync indication.

18. A terminal, comprising:
    a memory storing a computer program; and
    a processor coupled to the memory and configured to execute the computer to perform operations comprising:
    performing, when a first cell or a first Bandwidth Part (BWP) corresponds to a plurality of transmission nodes, radio link monitoring on at least one first transmission node in the plurality of transmission nodes,
    wherein after the performing radio link monitoring on at least one first transmission node in the plurality of transmission nodes, the operations further comprise:
       performing a transmission node recovery process when it is determined that a transmission node failure occurs in the at least one first transmission node; or
       reporting transmission node failure information when it is determined that a transmission node failure occurs in the at least one first transmission node.

19. The terminal according to claim 18, wherein the transmission node recovery process comprises at least one of the following:
- triggering connection re-establishment when the first cell has only one first transmission node, and the first cell is a primary cell;
- triggering secondary cell group failure reporting when the first cell has only one first transmission node, and the first cell is a primary secondary cell;
- changing another transmission node of the first cell or the first BWP into a working or active transmission node when the first cell or the first BWP has only one first transmission node;
- changing another BWP into a working or active BWP when the first BWP has only one first transmission node, and the first BWP is a working or active BWP;
- reporting the transmission node failure information when the first cell or the first BWP has a plurality of first transmission nodes, and the transmission node failure occurs in only some transmission nodes in the plurality of first transmission nodes;
- changing another transmission node of the first cell or the first BWP into a working or active transmission node when the first cell or the first BWP has a plurality of first transmission nodes, the transmission node failure occurs in only some transmission nodes in the plurality of first transmission node, and the transmission nodes are working or active transmission nodes;
- changing another BWP into a working or active BWP when the first BWP has a plurality of first transmission nodes, the transmission node failure occurs in only some transmission nodes in the plurality of first transmission nodes, and the first BWP is a working or active BWP;
- triggering connection re-establishment when the first cell has a plurality of first transmission nodes, the transmission node failure occurs in all of the plurality of first transmission nodes, and the first cell is a primary cell; or
- triggering secondary cell group failure reporting when the first cell bas a plurality of first transmission nodes, the transmission node failure occurs in all of the plurality of first transmission nodes, and the first cell is a primary secondary cell.

20. The terminal according to claim 18, wherein the transmission node failure information comprises at least one of the following:
- an identifier of a cell in which the transmission node failure occurs;
- a type of the cell in which the transmission node failure occurs;
- a cell group in which the transmission node failure occurs;
- an identifier of the first transmission node in which the transmission node failure occurs;
- an identifier of a BWP in which the transmission node failure occurs;
- a measurement result corresponding to the first transmission node in which the transmission node failure occurs;
- a measurement result corresponding to a serving cell in which no transmission node failure occurs;
- an identifier of an available transmission node in which no transmission node failure occurs;
- a measurement result of the available first transmission node in which no transmission node failure occurs; or
- a measurement result corresponding to a neighbor cell or a non-serving cell.

* * * * *